Patented Sept. 8, 1942

2,294,937

UNITED STATES PATENT OFFICE 2,294,937

CEVITAMATE COMPOUND

Simon L. Ruskin, New York, N. Y.

No Drawing. Application February 26, 1938,
Serial No. 192,789

4 Claims. (Cl. 260—344)

This invention is directed to the production of certain compounds made from cevitamic acid and having therapeutic properties.

More particularly, the present invention is directed to combinations of cevitamic acid with other organic compounds, nitrogenous in character and having an amino group therein. The latter compounds normally have therapeutic properties and may be considered as belonging to the class of alkaloids, particularly ephedrine, benzedrine and adrenaline.

Cevitamic acid, which is more commonly known as Vitamin C, is a well known therapeutic compound having an empirical formula of $C_6H_{10}O_7$. It has certain well known beneficial effects when administered to a human being, as it assists the functioning of the body and aids in the eradication of certain diseases, particularly those due to deficiencies of diet. However, this compound is rather unstable and will deteriorate in a relatively short time, so that unless it is used shortly after being produced, it may deteriorate to such an extent that little or no beneficial effects therefrom will be obtained. It was customary to administer cevitamic acid by itself without admixture in other compositions. Probably one of the reasons therefor is that cevitamic acid is unstable and is a strong reducing agent. By reason of its reducing properties, it might be expected to attack other medicinal compounds in the composition. Thus there would be destruction not only of the cevitamic acid, but of other ingredients mixed therewith. Instead, cevitamic acid has a stabilizing action on ephedrine, benzedrine and adrenaline and intensifies the physiologic properties of each.

Certain amino compounds which may be broadly classed as alkaloids and the like are administered to the human being for various therapeutic purposes. These compounds are generally insoluble in water or, at the best, but slightly soluble and it has been customary to combine such alkaloids with an inorganic acid such as hydrochloric or sulphuric acid to form a salt thereof. Such salts are freely soluble in water and may be readily administered, but they suffer from the disadvantage that the acid constituent is irritating to the human body and causes undesirable effects and reactions.

The present invention is intended and adapted to overcome the disadvantages inherent in the production and use both of cevitamic acid and the alkaloids, it being among the objects of the present invention to provide a chemical compound which is stable, non-toxic to human beings, freely soluble in water, possesses therapeutic properties, and is readily administered.

In practicing my invention, I cause cevitamic acid to react with an alkaloid or other organic nitrogen compound having a reactive NH group and having therapeutic properties. The nitrogen in said compound has a valence of 3 and in combining with the cevitamic acid, the valence is increased to 5 and the acid hydrogen atom of the cevitamic acid and the acid radical itself are directly joined to the nitrogen. I have found that by starting with the free alkaloid and suspending the same in water, a reaction between the same and the acid may be caused to readily occur, merely by contacting the reactants.

The following is a specific example of the operation of my invention: I take 1.65 grams of ephedrine alkaloid and suspend the same in approximately 20 cc. of water. The suspension is stirred, causing the same to go into solution. The stirring is continued for a considerable length of time, during which 1.76 grams of cevitamic acid are added in portions during the stirring operation. The acid goes into solution almost instantly, at the same time combining with the alkaloid already in solution to form an addition compound. After approximately 15 minutes, the entire solution is clear and all of the alkaloid has gone into solution and been combined with the cevitamic acid.

The compound is neutral in character and is non-irritating to human beings. This is in distinction to the hydrochloride or the sulphate of ephedrine which are highly irritating. The compound is freely soluble in water and is completely stable even though the cevitamic acid itself is unstable. It was to be expected that because of the strong reducing properties of the cevitamic acid, it would cause decomposition of the ephedrine, but as a matter of fact, no such decomposition or reduction of either of the ingredients takes place.

The combination is adapted for various therapeutic uses, as for the treatment of scurvy, as a decongesting agent, anti-allergic medicament, and as a detoxicant. While the ephedrine does not in itself have antiseptic or anti-virucidal properties, its compound with cevitamic acid possesses such properties. The new compound is of considerable value in relieving congestion in the case of colds with an increase of resistance to infection simultaneously therewith. The vasoconstricting action of the ephedrine is not impaired by the combination with the cevitamic acid and the action of the cevitamic acid is not at all diminished by the combination which improves the calcium metabolism and assists decongestion.

Similarly, other compounds of cevitamic acid may be prepared, as, for instance, the benzedrine cevitamate. The method of formation thereof is similar to that of the ephedrine compound, the reaction going on smoothly and completely by merely mixing the ingredients in the presence of water and stirring. This compound is of value therapeutically and may be taken by mouth in order to obtain the well known benzedrine action. However, there is absent the irritating action normally associated with the sulphate or the like in the form previously used. The function of the vitamin C in the compound improves the calcium metabolism, thus exercising a stabilizing action on the vegetative nervous system. In narcolepsy, the reduction properties of the cevitamic acid supplement the benzedrine action because of its detoxicating effects.

Similarly to the above, a combination may be made with adrenaline to form the adrenaline cevitamate. This reaction also goes on rapidly and completely by merely mixing the ingredients, preferably in the presence of water. The compound may be used for the same purposes as adrenaline is commonly used with the additional effect that it is a more desirable form for introduction into the human system than the hydrochloride or the like. The combination with cevitamic acid has an important effect in that it tends to conserve the adrenaline strength of the body reserves. It seems to prevent too rapid oxidation of the adrenaline in the body and thus prolongs its action over a greater period of time. The compound also enhances the action of the adrenaline in several respects, as for example, in that it improves the blood coagulation of the patient. Furthermore, the cevitamic acid simultaneously improves the calcium metabolism and thus indirectly assists in the adrenaline action. The cevitamic acid also tends to stimulate adrenaline secretion by the adrenal glands.

In addition, when ephedrine is combined with the cevitamic acid, decongestion as well as antiseptic action is obtained. The use of ephedrine in the treatment of the common cold is widespread. The ephedrine cevitamate presents a neutral solution supplying Vitamin C that is not irritating to the mucous membranes of the nose and throat and increases the general resistance to the cold virus.

Aryl amino compounds may be coupled with the cevitamic acid to produce new compounds having improved properties. Among such substances is the p-amino benzene sulfanamide which is a well known specific against streptococcus infections. This and similar substances are brought into contact with the cevitamic acid, causing the same to combine with the formation of a well defined compound, sulfanilamide cevitamate.

Heterocyclic compounds having a reactive amino group are also suitable for the production of valuable therapeutic compounds. For instance, one may bring the 2.6 diamino 2-ethyl pyridine, which possesses anesthetic properties, into reactive contact with cevitamic acid to cause the formation of an amino-ethyl-pyridine-amino-cevitamate having considerably improved properties. Other compounds of analogous character and having the pyridine or quinoline nucleus may be employed in this reaction.

Many di-azo compounds are known which have found application as valuable anti-bacterial agents and contain aryl as well as heterocyclic groups. These compounds may be combined with cevitamic acid in accordance with the present invention. As typical of such compounds one may take the 3.6 diamino 2-methyl 5-phenylazo pyridine and combine the same with cevitamic acid as above explained. Other compounds of the azo type having two heterocyclic radicals are also applicable to the present invention; for example, the 2.6 diamino 3-pyridylazo pyridine may be coupled with the cevitamic acid to give bactericidal compounds of improved value. Also available are similar compounds having substituent groups in place of one or more of the free hydrogens on the rings, such as halogen, hydroxy, alkoxy, alkyl, aryl and the like.

From the above it will be seen that a very large variety of therapeutic compounds of diverse characters are suitable for combination with cevitamic acid, forming compounds of enhanced value. While the character of the compounds may vary widely, it is essential that there be present an amino group capable of combining with an acid group under the conditions stated above or under other conditions well known to the skilled chemist.

Although I have described my invention by reference to several specific embodiments thereof, my invention is not limited to the details set forth above. I am not to be limited to the specific compounds described, as other compounds of analogous character may be formed wherein the reactive amino group is attached to organic radicals of alkyl, aryl, aralkyl, heterocyclic and mixed types, as for example, the triethanolamine and monoethanolamine cevitamates. It is merely essential that the organic compound have a nitrogen atom which is reactive with an acid group, thereby a combination which may be termed an addition product is formed. Various other alkaloids than those described above are suitable for the production of the compounds claimed herein. The details of the method used are not at all essential and variations therein will be apparent to those skilled in the art. It is not necessary to start with the free alkaloid nor to use water solutions, and it may be possible to use other solvents in place thereof. The proportions of the ingredients may be varied, although preferably they are combined in equimolecular proportions.

These and other changes may be made in the details of my invention which is to be broadly construed and which is limited only by the scope of the claims appended hereto.

What I claim is:

1. As a therapeutic agent, the product of the reaction of an organic therapeutic compound having a reactive NH group taken from the class consisting of ephedrine, benzedrine, and adrenaline, with an amount of cevitamic acid sufficient to convert substantially all of the said compound into an addition compound with cevitamic acid, said product being soluble in water and non-toxic to human beings.

2. As a therapeutic agent, the product of the reaction of ephedrine with a substantially equimolecular proportion of cevitamic acid, said product being soluble in water and non-toxic to human beings.

3. As a therapeutic agent, the product of the reaction of benzedrine with a substantially equimolecular proportion of cevitamic acid, said product being soluble in water and non-toxic to human beings.

4. As a therapeutic agent, the product of the reaction of adrenaline with a substantially equimolecular proportion of cevitamic acid, said product being soluble in water and non-toxic to human beings.

SIMON L. RUSKIN.